United States Patent Office 3,700,499

Patented Oct. 24, 1972

3,700,499

MAGNETIC RECORDING ELEMENT

Gottfried C. Haack, Stamford, and Lindley Clair Beegle, Darien, Conn., assignors to American Cyanamid Company, Stamford, Conn.

No Drawing. Filed June 17, 1969, Ser. No. 834,160
Int. Cl. H01f *10/02*
U.S. Cl. 117—235 2 Claims

ABSTRACT OF THE DISCLOSURE

A magnetic recording element comprising a support having thereon a recording film of particulate material consisting essentially of magnetic particles having an iron core with an layer of iron nitride, $Fe_4N$, coating.

The invention relates to improvements in magnetic recording elements and methods of making and using the same.

Magnetic recording elements that have been most widely used are magnetic tapes, belts, discs and the like which comprise a recording film of magnetic particles in an organic binder, adhered to a support such as synthetic resin film base or the like. The magnetic particulate material most widely used in acicular iron oxide, and particularly acicular particles of gamma iron oxide, $Fe_2O_3$. Chromium oxide $CrO_2$ has also been used as magnetic material in some magnetic recording elements.

The film of magnetic material on the support is the signal-bearing medium for information storage. Quality magnetic recording requires a recording medium that gives large signal to noise ratio; in some cases it is also desirable that the recording medium be able to record with high information-bit density. The properties of the magnetic material that give these desired recording qualities are high magnetic remanence value and high coercivity value. Since the remanence of a material will never exceed its saturation magnetization, the selected magnetic material preferably will have large saturation magnetization. Elemental iron particles of appropriate shape and size would have very suitable magnetic properties for magnetic recording films. However, elemental iron is not chemically stable in finely divided particulate form. The maximum saturation magnetization value for pure iron is about 21,000 gauss. By way of comparison, gamma iron oxide, $Fe_2O_3$, has a maximum saturation magnetization value only about 4800 gauss. Despite this relatively low magnetization value, acicular gamma iron oxide has been a generally used recording material because of its excellent chemical stability, good coercivity, and low cost.

The invention provides a magnetic recording element with a magnetic film of particulate material which comprises iron nitride, such as particulate iron nitride, $Fe_4N$, or particles with iron nitride, $Fe_4N$, in combination with other magnetic material such as iron. The iron nitride in this signal-bearing magnetic layer is more stable than pure iron, against such deteriorating agents as the combination of elevated temperature and humid air. Iron nitride in such layers will have generally higher saturation magnetization and remanence than gamma iron oxide would have in similar recording layers. Coercivity values of particles consisting entirely of iron nitride can easily be made comparable to coercivity values of gamma iron oxide, however, by choosing a proper particle size considerably higher coercivities can be obtained. High coercivities can also easily be obtained with particles comprising iron with iron nitride. Chemical stability of these particles comprising iron nitride is quite adequate for making practical magnetic recording elements that will withstand ordinary use.

Magnetic recording elements of the invention will have a film of the particles comprising iron nitride on any support that is suitable for use in magnetic recording, such as discs, drums, flexible belts and tapes, and the like. Materials for the film support will usually be nonmagnetic materials and may include for example plates, wires or foils of nonferrous metals, synthetic resin film supports such as polyethylene terephthalate, cellulose acetate and the like. The film binder for the film layer of particulate magnetic iron nitride particles may be any suitable film-forming, non-magnetic binder material that will bind the particles in a film on the selected support. For example, a thermoplastic particulate binder may be mixed with the magnetic particles, applied as a dry powder or in a fluid slurry, then set by heating or by drying and heating. Or a soluble polymer in a volatile liquid solvent vehicle may be applied with magnetic particles slurried in the solution and set by evaporating out the solvent. A thermosetting polymer may be applied in mixture with the magnetic particles and set by heating, or a polymer that will precipitate from suspension in liquid by means of a precipitating agent, may be applied as a slurry and precipitated by use of such precipitating agent, then dried. The binder preferably should be one that separates the individual particles in the layer to avoid magnetic interaction of contacting particles: The iron nitride pigment can be combined with binders and coating vehicles and applied by any suitable method, as by any of the methods that are known for mixing and coating iron oxide pigments for making magnetic recording films. Some suitable binder and vehicle formulations, described for use with iron oxide but in which iron nitride can be substituted for making elements according to the present invention, are described for example in U.S. Pat. No. 3,200,007 patented Aug. 10, 1965. There are many other suitable binder formulations available.

Particles of iron nitride, $Fe_4N$, or particles of iron nitride in combination with iron might be used in mixtures with particles of other magnetic materials in a magnetic recording layer, for example, mixed in a layer with particles of gamma iron oxide, to achieve a magnetic layer having some particularly desired combination of physical or magnetic properties.

The magnetic properties of iron nitride are especially suitable for making magnetic recording elements intended for use in magnetic recording apparatus for audio recording, video recording, computer data recording and the like. A recording element with iron nitride can be made with a coercivity value in the same range as that for standard commercial iron oxide recording elements, and the iron nitride will usually have higher remanence value than the iron oxide would have. Thus the iron nitride recording element will operate in recording equipment designed for use with iron oxide, and will provide better signal-noise ratio because of the higher remanence. For use in magnetic recording applications where the combination of high remanence with high coercivity is desired, such as in magnetic computer data recording where higher coercivity gives the desired higher bit density capability, either $Fe_4N$ of smaller particle size or particles comprising iron nitride in combination with elemental iron may be used to advantage.

In a preferred method of making $Fe_4N$ particles for magnetic recording, gamma iron oxide is nitrided at elevated temperature in an atmosphere comprising ammonia and hydrogen. Elemental iron may be similarly nitrided either wholly or only partially. Suitable nitriding processes of this kind have been described in detail by Lehrer, Zeitschrift fur Electrochemie, vol. 36 pp. 383–392 (1930)

and by Shirane et al., Physical Review, vol. 126 No. 1, p. 49 et seq. (1962). Time required for substantially complete nitridization will depend upon several variable factors such as the selected temperature, concentration of the nitriding agents in the contacting atmosphere, particle size and shape, etc. Generally, the time required for complete or near-complete nitridization by this process will range from several hours to several days. In one variation of the process, iron oxide is first reduced in an atmosphere of hydrogen and then nitrided in ammonia. It is not necessary in all instances to carry the nitriding to completion if a particle comprising both iron and iron nitride is wanted.

On completion of the nitriding process, the $Fe_4N$ in the particles may be susceptible to deterioration by atmospheric oxygen or humidity because of residual hydrogen which may be entrained in or adsorbed on the nitride material. To guard against such deterioration, immediately after nitriding, the particles are first cooled in a stream of nitrogen or other inert gas and then treated by immersion in acetone or other inert solvent to remove residual hydrogen before exposure to air. The solvent preferably is a volatile organic liquid that is essentially free of dissolved oxygen. Solvents other than acetone that would be suitable for this purpose include benzene, hexane, cyclohexene, fluorinated hydrocarbons and the like. With precautions taken as described, the $Fe_4N$ will remain stable under ordinary conditions in a magnetic recording layer. Even under extreme test conditions (e.g. 50° C. rel. hum. 75% for extended periods) the magnetic layer will lose only a small percentage of its highest remanence value.

Following are specific examples including description in detail of a presently most preferred mode of carrying out the invention.

EXAMPLE 1

Iron nitride is prepared by nitriding fine acicular particles of gamma iron oxide, in an atmosphere of mixed ammonia and hydrogen. The iron oxide particles used are about 200 to 500 mμ in length and about 60 to 80 mμ thick. Six grams of this gamma iron oxide (Pfizer MO 4526) in a porcelain boat is heated to 400° C. in a gas stream consisting of 55 mole percent $NH_3$ and 45 mole percent hydrogen. This treatment is continued for 24 hours then the temperature is raised to 500° C. and the same treatment is continued at this temperature for another 24 hours. The sample is then cooled to about 20° C. in a nitrogen stream. The powder is washed in acetone to remove residual hydrogen before exposure to air. The product is iron nitride, $Fe_4N$, having a face-centered-cubic iron sublattice. Some of the acicular particles have crumbled and average particle size is now about 50 to 100 mμ. Tests of the magnetic properties of these particles yield the values tabulated in Table I. Also shown for comparison are measured magnetic properties of the gamma iron oxide particles.

TABLE I

| | Example I | Conventional material | Example II | Example III |
|---|---|---|---|---|
| Magnetic particles | $Fe_4N$ | $Fe_2O_3$ | $Fe_4N$ | $Fe+Fe_4N$ |
| Saturation magnetization, gauss | 10,700 | 3,300–3,600 | 9,830 | 11,500 |
| Remanence, gauss | 3,410 | 1,900–2,100 | 3,190 | 4,450 |
| Coercivity, oersteds | 244 | 300–320 | 314 | 500 |

EXAMPLE 2

Ten grams of the same kind of gamma iron oxide is treated as described in Example 1 except treatment is at 340° C. in atmosphere of 67 mole percent $NH_2$, 33 mole percent $H_2$, for 17 days. Particle size of the product is about the same as in Example 1. Measured magnetic properties of the product are tabulated in Table I.

EXAMPLE 3

Seven grams of the same kind of gamma $Fe_2O_3$ particles are treated at 360° C. for 3 days in an atmosphere of 55% $NH_3$ and 45% $H_2$. X-ray analysis of this product identifies a mixture of $Fe_4N$ and Fe. An electron diffraction pattern indicates that the particles consist of a core of elemental iron, Fe, covered by a protective outer layer of $Fe_4N$. The measured magnetic properties of this product are tabulated in Table I. The substantially higher coercivity of this product suits it particularly well for use in magnetic recording applications that specifically require high bit density recording. Particles with saturation magnetization values up to about 15,000 gauss can be obtained by wholly or partially nitriding iron powders of larger particle sizes, up to about 500 millimicrons. When such particles are partially nitrided the $Fe_4N$ forms a layer covering the iron core. This layer will protect the iron core from exposure to air and other deteriorating factors. Thus the $Fe_4N$-coated particle has the high magnetic remanence characteristic of its iron core without the disadvantage of chemical instability of finely divided iron.

EXAMPLE 4

Iron nitride, $Fe_4N$, particles prepared as described in Example 1 is mixed with a vehicle in a slurry having the composition:

Pigment ($Fe_4N$) to Binder (Resin VAGH) ratio 3 to 1, by weight;
Pigment: 210 parts by wt. $Fe_4N$
Binder: 70 parts by wt. Resin VAGH (a vinyl acrylate-vinyl chloride copolymer)
Solvent: 140 parts by wt. toluene
Solvent: 140 parts by wt. methyl isobutyl ketone
Plasticizer: 35 parts by wt. Paraplex G–25 (a high mol. wt. polyester plasticizer)
Stabilizer: 6 parts by wt. Adsolite organo-tin sulfur
Dispersant: 6 parts by wt. Alcolac BS soya lecithin wt. percent solids in slurry, 59%.

No. 75445 Rampmeyer, C. M. 9–25–72 Day Mach. 58

The mixture is ball milled for 18 to 36 hours then coated as a continuous film having 6 micron wet thickness on a 6 in. wide strip of 1.5 mil. thick polyethylene terephthalate film base. While the film coat is still wet, the coated strip is drawn through a magnetic field to align the $Fe_4N$ particles in the wet film, parallel with the axis of the strip. The film is then quickly dried by evaporation and the coated strip is slit into ¼" wide strips which are spliced and a wound on a reel. This magnetic tape performs well in use as the magnetic recording element for a conventional audio tape recorder. Another tape is prepared the same but using particles of $Fe_4N$ prepared in Example 2; this tape is also suitable for use in a conventional audio tape recorder. The particles prepared in Example 3 are used in making a magnetic recording tape for an electronic computer having a tape recorder which has been adapted with a high bit density magnetic recorder head that can take advantage of the high coercivity value of this material. This tape has good signal to noise ratio and is capable of recording at higher bit density because of the higher coercivity. This tape is made the same as in Example 1, but using the particles prepared in Example 3 and with the variation that the tape is slit to size to fit the computer reels and recording head.

We claim:

1. An improved magnetic recording element comprising a support having thereon a recording film of magnetic particulate material consisting essentially of magnetic particles having an iron core covered by a layer of iron nitride, $Fe_4N$.

2. A magnetic recording element defined by claim 1 wherein said film consists essentially of the defined magnetic particles in a binder.

References Cited

UNITED STATES PATENTS

| | | | |
|---|---|---|---|
| 2,441,770 | 5/1948 | Kroll | 75—37 X |
| 2,872,292 | 2/1959 | Altmann | 252—62.55 X |
| 2,994,600 | 8/1961 | Hannsen | 148—16.6 X |
| 3,384,589 | 5/1968 | Duntnon | 252—62.55 X |
| 3,387,993 | 6/1968 | Flowers | 117—235 |
| 3,546,675 | 12/1970 | Che Chung-Chow et al. | 117—235 |

WILLIAM D. MARTIN, Primary Examiner

B. D. PIANALTO, Assistant Examiner

U.S. Cl. X.R.

23—191; 252—62.51, 62.54